United States Patent
Schenk

(10) Patent No.: US 7,233,507 B2
(45) Date of Patent: Jun. 19, 2007

(54) NON DISSIPATIVE SNUBBER CIRCUIT WITH SATURABLE REACTOR

(75) Inventor: Kurt Schenk, Rancho Santa Margarita, CA (US)

(73) Assignee: Optimum Power Conversion, Inc., Irvine, CA (US)

(*) Notice: Subject to any disclaimer, the term of this patent is extended or adjusted under 35 U.S.C. 154(b) by 283 days.

(21) Appl. No.: 11/131,465

(22) Filed: May 18, 2005

(65) Prior Publication Data
US 2006/0262577 A1    Nov. 23, 2006

(51) Int. Cl.
*H02H 7/10*    (2006.01)
*G05F 1/10*    (2006.01)
*H02M 3/335*   (2006.01)

(52) U.S. Cl. .................. 363/50; 363/56.12; 323/222
(58) Field of Classification Search ............ 363/50, 363/52, 53, 55, 56.01, 56.09, 56.12; 323/222, 323/223, 225
See application file for complete search history.

(56) References Cited

U.S. PATENT DOCUMENTS

| | | | |
|---|---|---|---|
| 5,414,613 A * | 5/1995 | Chen | 363/52 |
| 5,636,114 A * | 6/1997 | Bhagwat et al. | 363/56.12 |
| 6,157,179 A * | 12/2000 | Miermans | 323/282 |
| 6,323,627 B1 * | 11/2001 | Schmiederer et al. | 323/222 |
| 7,078,868 B2 * | 7/2006 | Samejima et al. | 315/219 |
| 7,095,630 B2 * | 8/2006 | Weber | 363/16 |

* cited by examiner

*Primary Examiner*—Matthew V. Nguyen

(57) ABSTRACT

A new type of the passive non-dissipative snubber with a single saturable reactor improves the performance of the boost converter used as a front-end active Power Factor Correction (PFC) in two critical areas: excess voltage stresses caused by high voltage spikes on input high voltage switching transistor of the boost converter is eliminated and EMI noise is much reduced. The high voltage spike energy instead of being dissipated as in a dissipative snubber circuits is recovered resulting in increased conversion efficiency. High voltage spike elimination also allows use of lower voltage rated devices with lower ON resistance, hence further increasing the efficiency of the PFC boost converter.

1 Claim, 5 Drawing Sheets

NON DISSIPATIVE SNUBBER CIRCUIT WITH SATURABLE REACTOR

FIELD OF THE INVENTION

This invention relates to the field of switching AC-to-DC and DC-to-DC power conversion and in particular to the new class of the non dissipative snubber circuit for the boost converter primarily (because of difficulties for soft switching implementation), but not limited only to it, which dramatically reduces the overvoltage stress on the MOSFET switch enabling use of the lower voltage rating components with lower $R_{ON}$ resistance for the higher efficiency of the converter and at the same time significantly improves the EMI characteristics with implementation of the smaller, low-cost EMI filters.

BACKGROUND OF THE INVENTION

The IEC 1000-3-2 regulation demand that higher output power converters (currently over 75 W) must have the front-end active Power Factor Correction (PFC) to meet the stringent requirements for the input current harmonics content. Thus, the front-end boost converter with active PFC feature is the most common solution present in the higher power designs of the AC-to-DC converters. High input line voltage causes that the main switch in the converter is exposed to high voltage stress, during switching transitions, caused by the very high voltage spikes superimposed on the already high rectified input line voltage. This in turn requires that the main MOSFET switch has a much higher voltage rating to sustain safely this overvoltage stress, which not only increases the cost of the component but also degrades efficiency performance of the converter. The MOSFET switch with higher voltage rating has the higher $R_{ON}$ resistance and higher conduction losses, which reduces overall efficiency of the converter.

Clearly, elimination of the switching voltage spikes will allow use of the lower voltage rating MOSFETs with lower $R_{ON}$ resistance and higher efficiency performance. To achieve this, many different types of snubber circuits were invented, which typically reduce the size of voltage spikes by absorbing and dissipating their energy. These solutions are helpful for the reduced voltage rating of the MOSFET switch, but benefit of reduced conduction losses because of the lower $R_{ON}$ resistance is mainly lost because of the additional dissipation losses of the snubber circuit. In fact, the dissipative snubber circuit is easily recognized by the presence of a resistor in the additional snubber network. A typical prior art circuit with dissipative snubber is shown in FIG. 1. Dissipative snubber circuits are now being made obsolete by use of the non-dissipative snubber circuits in which the dissipative resistor is replaced by one or more of the energy storage devices, such as inductors and capacitors, which together with additional switching devices (transistor and diodes) form an energy recovering network to restore the energy which would otherwise be lost in dissipative snubber resistor.

In summary, the snubber circuits can be first classified into two categories:
1. Dissipative snubber circuits
2. Non-dissipative snubber circuits.

The non-dissipative snubber circuits, in turn, can further be classified into tow categories:
1. Active non-dissipative snubber circuits, which are characterized by the presence of one or more active switching devices, such as MOSFET transistors, which require additional appropriate transistor drive control making these solutions less attractive.
2. Passive non-dissipative snubber circuits, which consists of only passive diode switching devices, thus eliminating the need for additional switching drive signals. The additional diodes are switched in response to the state of the converter rather than the external drive signal as in switching transistors.

An example of the prior art of the first category is the circuit described in U.S. Pat. No. 5,414,613 issued May 9, 1995 to Keming Chen. This prior art passive snubber circuit has an additional limitation that is limited to the operation of the converter in discontinuous conduction mode, which is not suitable for higher power converter due to its high peak inductor current. The present invention does not have such limitation and is well suited for high power applications, such as 1 kW experimental example described later.

The present invention also belongs to the second category of passive non-dissipative snubber since it does not use additional active switching devices. The prior art passive snubber described in U.S. Pat. No. 5,636,114 by Pradeep Bhagwat et al., uses in addition to an inductor two additional saturable reactors, as opposed to a single saturable reactor of present invention making it more complex and costly to implement.

This invention results in a non-dissipative snubber circuits with very effective reduction of the transitional voltage spikes without power losses which are usually present to certain extent in some of the prior art passive non-dissipative snubber circuits. The switching converters with new non-dissipative snubber with single saturable reactor disclosed herewith eliminates one or more drawbacks of each of the prior art passive snubber circuits and thus results in the higher efficiency, lower EMI noise, and lower voltage rating of the main MOSFET switch. This results in not only the better performance of the converter but also in its lower overall cost and simpler more reliable snubber circuit.

DEFINITIONS

The following notation is consistently used throughout this text in order to facilitate easier delineation between various quantities:
1. $I_1$, $V_2$ —The customary notation is to use capital letters, such as $I_1$ and $V_2$ to designate quantities constant in time, such as DC current in converters or DC voltages. However, herein, during the start-up of the switching converters these quantities are also changing in time. Thus, the DC quantities are for purposes of this disclosure also assumed to be function of time during the start-up transient.
2. $S_1$, $S_2$, —Switch designations respectively for input switch and output switch;
3. D —The duty ratio is defined as $D=t_{ON}/T_s$ where $t_{ON}$ is the ON time interval during which the input switch is closed (turned ON) and $T_s$ is the switching period defined as $T_s=1/f_s$ where $f_s$ is a switching frequency;
4. D'—The complementary duty ratio D' is defined as $D'=t_{OFF}/T_S$ where $t_{OFF}$ is the OFF time interval during which the input switch $S_1$ is open (turned OFF) and the output switch $S_2$ is closed.

SUMMARY OF THE INVENTION

A primary objective of this invention is to provide an effective solution for reduction and/or complete elimination of voltage spikes present in the high voltage MOSFET switching devices during turn-off switching transition. This invention uncovers for the first time that the voltage stress on input switch in some standard switching converter topologies, primarily boost converter topology, could be dramatically reduced, or almost eliminated, without unnecessary dissipation of power losses present in the prior art solutions and with least circuit complexity. Thus, another objective of the present invention is to increase efficiency of the converter and improve its EMI performance.

A new snubber circuit accomplishes all of these objectives. This circuit was named "non-dissipative Saturable Reactor (SR) snubber" since it uses unique characteristics of a single saturable reactor (SR) to provide a non-dissipative reduction of the voltage spikes present on the main high voltage MOSFET switch. In addition to substantial reduction of the voltage stress of the high voltage switching device an added practical benefit of using saturable reactor is the smooth switching waveforms, which dramatically reduce EMI noise and need for heavy external EMI filtering.

A number of embodiments are presented which describe several alternatives how to implement this non-dissipative SR snubber circuit. In one of the realizations of the new non-dissipative SR snubber method for the case of the boost converters with one MOSFET switch and one diode the SR snubber circuit is shown to consist of the five signal processing diodes, two small capacitors, one small inductor, and one saturable reactor (FIG. 2).

DETAILED DESCRIPTION OF THE INVENTION

Introduction

This is a functional description with idealized waveforms of the new non-dissipative snubber circuit during one switching cycle of the converter.

Interval (a)

During this interval (a), the main switch Q is turned-OFF so that input current $I_L$ flows trough the input inductor L, saturable reactor SR and the main diode D to the output capacitor C. The snubber circuit of the main switch Q is inactive during this interval (a) while capacitor $C_1$ is charged to the output voltage Vout and capacitor $C_2$ is discharged.

Interval (b)

Figure 1:
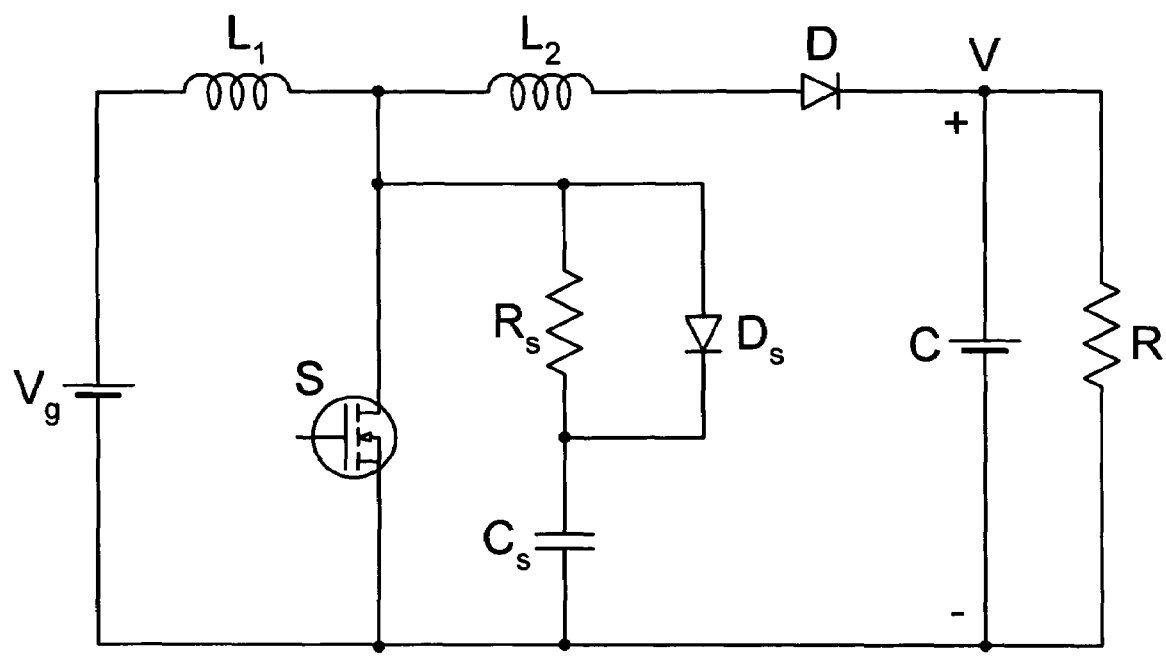
FIG. 1 illustrates prior-art dissipative snubber circuit.
Figure 2:
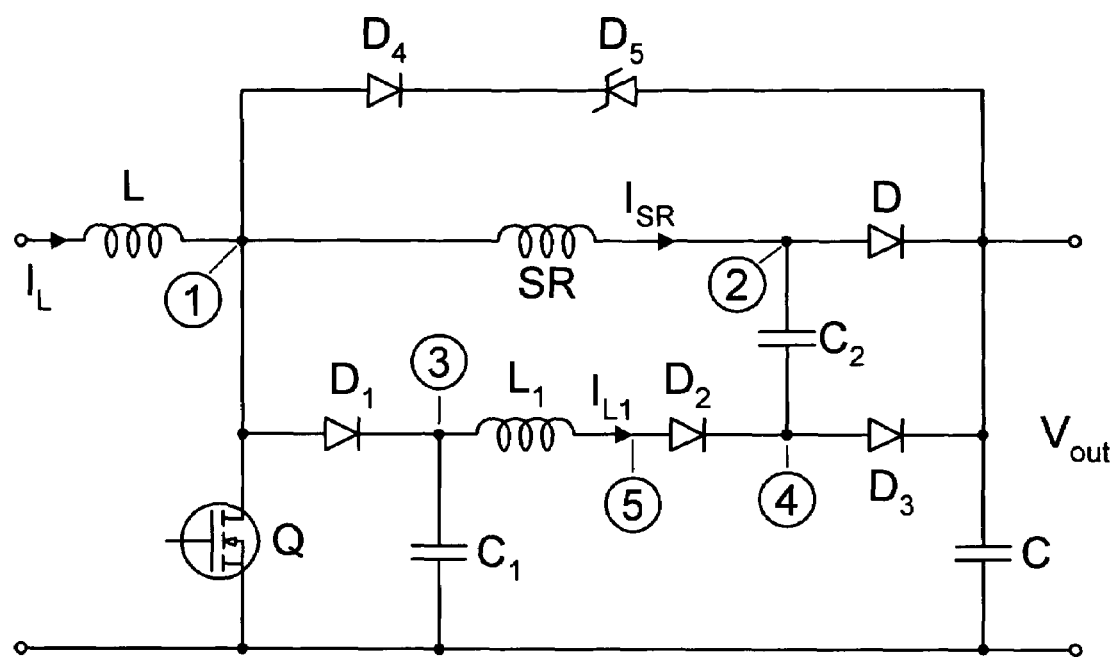
FIG. 2 illustrates the new non-dissipative SR snubber circuit.
Figure 3A:
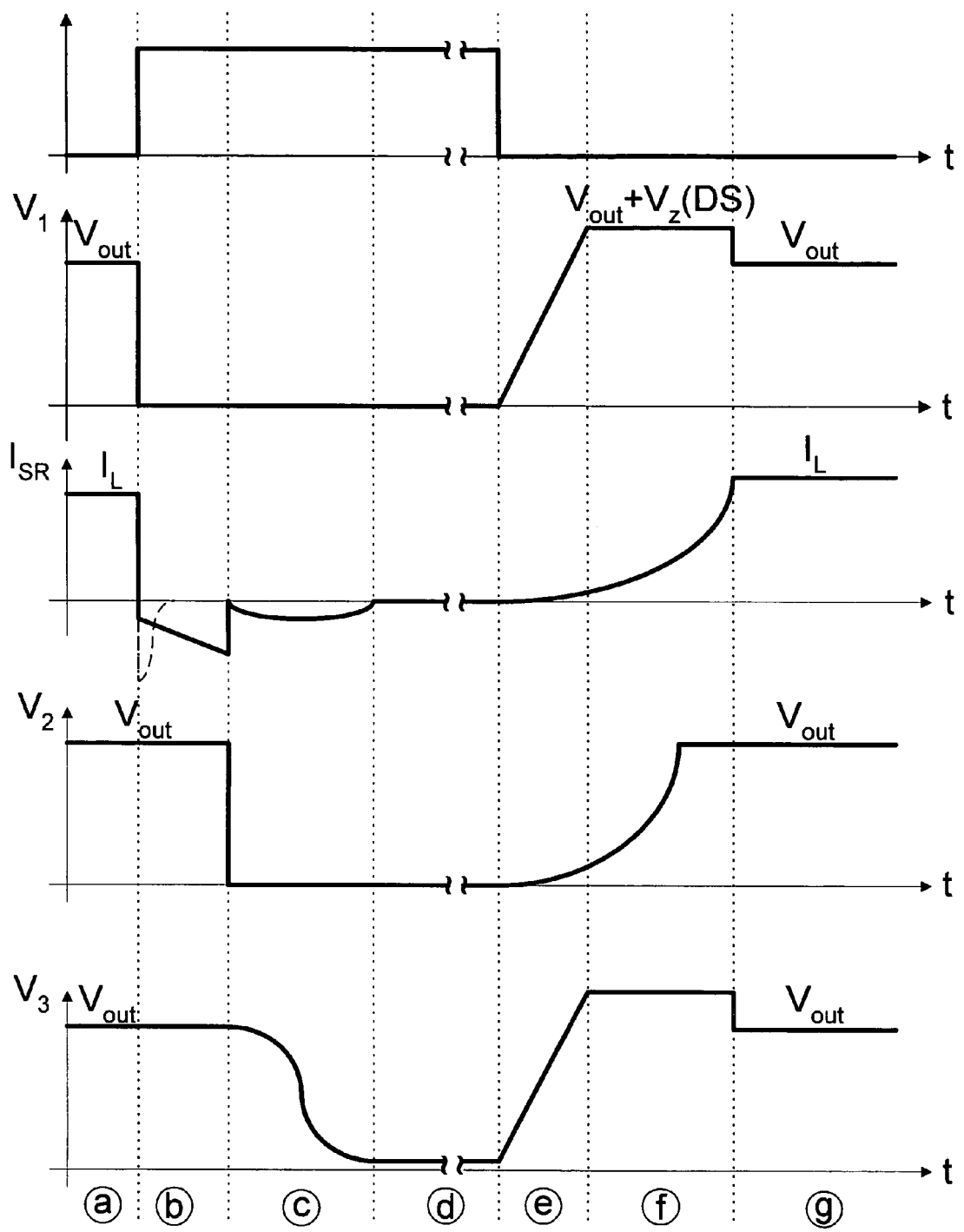
FIG. 3a illustrates the characteristic waveforms of voltages $V_1$, $V_2$, $V_3$ and saturable reactor current $I_{SR}$ during turn-ON and turn-OFF of the main MOSFET switch.

This interval starts with the turn-ON of the main switch Q at which instant its voltage drops to zero almost immediately (waveform $V_1$ for voltage of node 1 on FIG. 3a). Diode $D_1$ prevents capacitor $C_1$ from discharging through the turned-ON main switch Q, hence the voltage $V_3$ of node 3 stays equal to the output voltage $V_{out}$ (waveform $V_3$ on FIG. 3a).

When the main switch Q was turned-ON, the current $I_L$ which was flowing through the main diode D drops to zero and reverses its direction. During the reverse recovery time of the main diode D the voltage $V_2$ at node 2 is kept high at the level of output voltage $V_{out}$.

Figure 4:
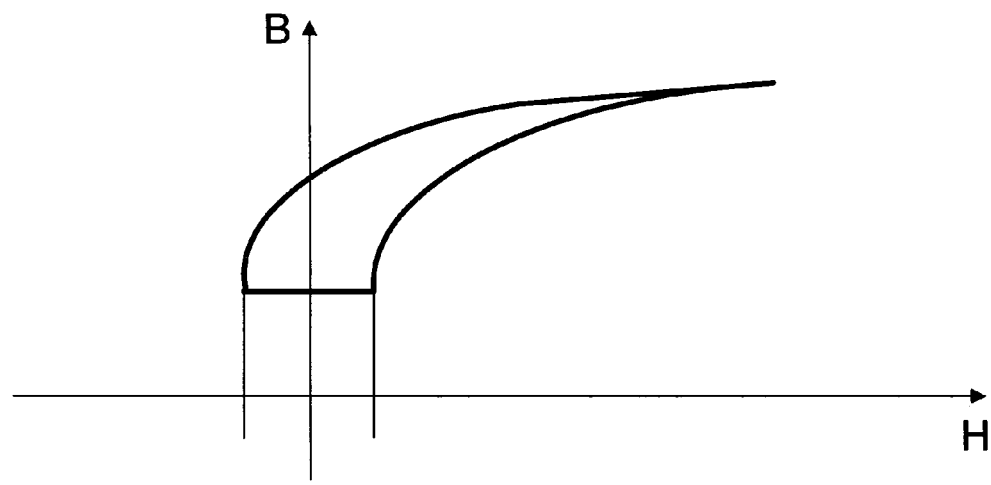
FIG. 4 The B-H characteristic of the saturable reactor magnetic core.

The reverse recovery current of the main diode D also flows through the saturable reactor SR, this time as a negative current (in the opposite direction). Due to the square nature of the BH-loop of the magnetic core of the saturable reactor SR (FIG. 4), the very small negative current in SR is needed to take the magnetic core out of saturation. This small negative current value was reached very quickly during reverse recovery time of the main diode D, at which point the inductance of the saturable reactor SR becomes very large and limits further increase of the reverse recovery current of the main diode D, which quickly fully turns-OFF afterwards. Hence, the very high maximum value of the reverse recovery current of the main diode D that could be reached during reverse recovery time (if SR was not present), is dramatically reduced and limited by the very low value of the negative current in SR needed to take out of saturation its special magnetic core with the square B-H characteristic of FIG. 4. This is one of the two main features of this new non-dissipative SR snubber circuit.

Interval (c)

This interval starts when the reverse recovery time of the main diode D is concluded and diode is fully turned-OFF. At that time, the negative current in the saturable reactor SR (the reverse recovery current) has reached its maximum value, which is very low compared to the possible maximum value of the reverse recovery current without implementation of the SR. Due to the squareness of the B-H loop of the magnetic core, this current can quickly drop to zero without causing a significant voltage undershoot in node 2, which also dropped to zero (FIG. 3a). The value of the voltage undershoot depends greatly on the magnetic core material property of the saturable reactor SR, i.e. the shape of the B-H-loop. In the case that the voltage undershoot at node 2 is too big, an additional diode could be placed between ground and node 2 to clamp this voltage undershoot.

Since the capacitor $C_2$ was initially discharged, the voltage at node 4 also drops to zero (voltage waveform $V_4$ on FIG. 3b), while the voltage at note 3 is still high because capacitor $C_1$ was initially charged to the output voltage $V_{out}$. Hence, the output voltage $V_{out}$ is applied across small inductor $L_1$ so that resonant discharge of the capacitor $C_1$ starts. This resonant circuit includes inductor $L_1$, capacitor $C_1$ (initially charged to $V_{out}$), capacitor $C_2$ (initially discharged), main switch Q which is turned-ON (could be considered as a short circuit), and saturable reactor has relatively low impedance due to the flatness of the B-H loop around the (Φ-H axis (the small amount of energy stored in the saturable reactor SR actually supports the resonant process).

Figure 3B:
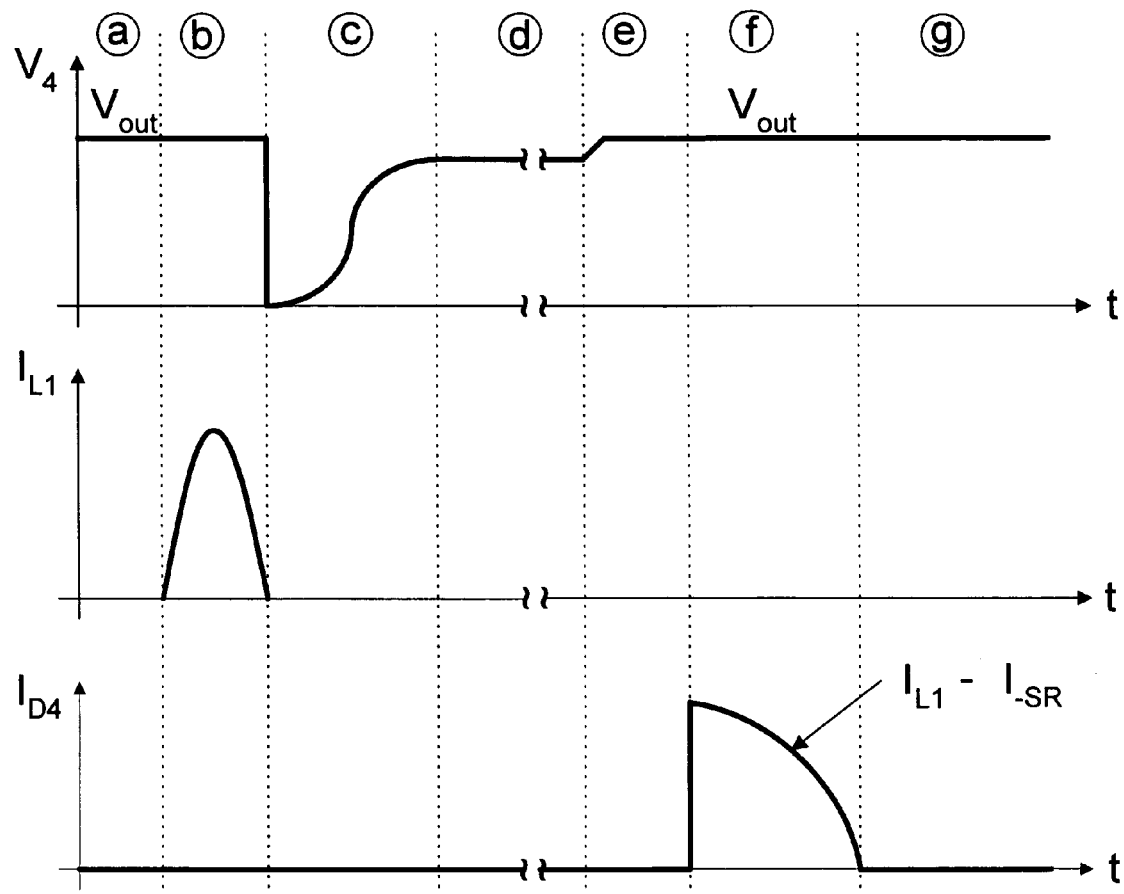
FIG. 3b illustrates the characteristic waveforms of voltage $V_4$ and currents $I_{L1}$ and $I_{D4}$ during turn-ON and turn-OFF of the main MOSFET switch.

After one half of a resonant cycle, the capacitor $C_1$ is discharged to nearly zero voltage while the capacitor $C_2$ is charged close to the output voltage value $V_{out}$ (see FIGS. 3a, 3b). At this point, the diode $D_2$ prevents the resonant current in $L_1$ to change direction and become negative (current waveform $I_{SR}$ in FIG. 3a), so the resonant process is stopped. During this one half of a resonant cycle, the energy initially stored in capacitor $C_1$ was almost completely transferred to capacitor $C_2$, which was initially discharged. This almost lossless resonant transfer of energy charge from capacitor $C_1$ to capacitor $C_2$ enables the non-dissipative work of the SR snubber circuit.

Interval (d)

During this interval, the main switch Q conducts the input current $I_L$, so the snubber circuit is inactive. The capacitor $C_1$ stays discharged while capacitor $C_2$ is charged to nearly $V_{out}$.

Interval (e)

This interval starts when the main switch is turned-OFF by the control circuit. The input current $I_L$ which flowed through the main switch, must continue to flow because of the magnetic energy of the input inductor L, hence, initially, it was forced to flow through the diode $D_1$ and charge capacitor $C_1$. Charging of the capacitor $C_1$ reduces the slope of the voltage rise (dv/dt) at node 1, and thus provides conditions for the zero-voltage turn-OFF of the main switch Q. This is the second important feature of this new non-dissipative SR snubber circuit.

Since the capacitor $C_2$ was charged in the previous interval, the voltage at node 2 is kept low, clamped by D3 (the voltage in node 2 is $V_{out}$ minus $V_{C2}$, which is close to zero initially). As the voltage in node 1 increases, also the voltage across saturable reactor SR increases, which increases its current and drives its magnetic core into saturation again. Typically the voltage in node 1 (as well as in node 3) reaches $V_{out}$ level before the magnetic core of the saturable inductor SR is completely in saturation and before the current in SR reaches its final value of $I_L$. Therefore the voltage in node 1 continues to rise above $V_{out}$ value until it is clamped by diode D4 and zener diode D5, which concludes this interval.

Interval (f)

The current through diodes D4 and D5 is the difference of the input current $I_L$ and the current $I_{SR}$ through the saturable rector SR. The current $I_{SR}$ continues to rise until the magnetic core of the saturable reactor SR is driven into full saturation, at which point all input current flows through the saturable reactor ($I_L=I_{SR}$) and current through diodes D4 and D5 drops to zero.

During this interval, the current $I_{SR}$ of the saturable reactor SR discharges capacitor $C_2$ through the diode $D_3$ so the voltage in node 2 increases (see voltage waveform $V_2$ in FIG. 3a). Typically, but not necessarily, before the current $I_{SR}$ in the saturable reactor SR reaches its final value $I_L$, the voltage in node 2 reaches the value of the output voltage level $V_{out}$ and at that point the main diode D starts to conduct. Since the magnetic core of the saturable reactor SR is already deep into saturation, only a small zener voltage on diode D5 is needed to ensure that the current $I_{D4}$ through diode $D_4$ will completely commutate to the main diode D so that the current in the clamping diodes D4 and D5 drops to zero. This completes the one switching cycle and brings the circuit conditions to the same state as at the beginning of the first interval (a). Hence, the new switching cycle starts as shown with the interval (g) on the FIGS. 3a, 3b.

Figure 5:
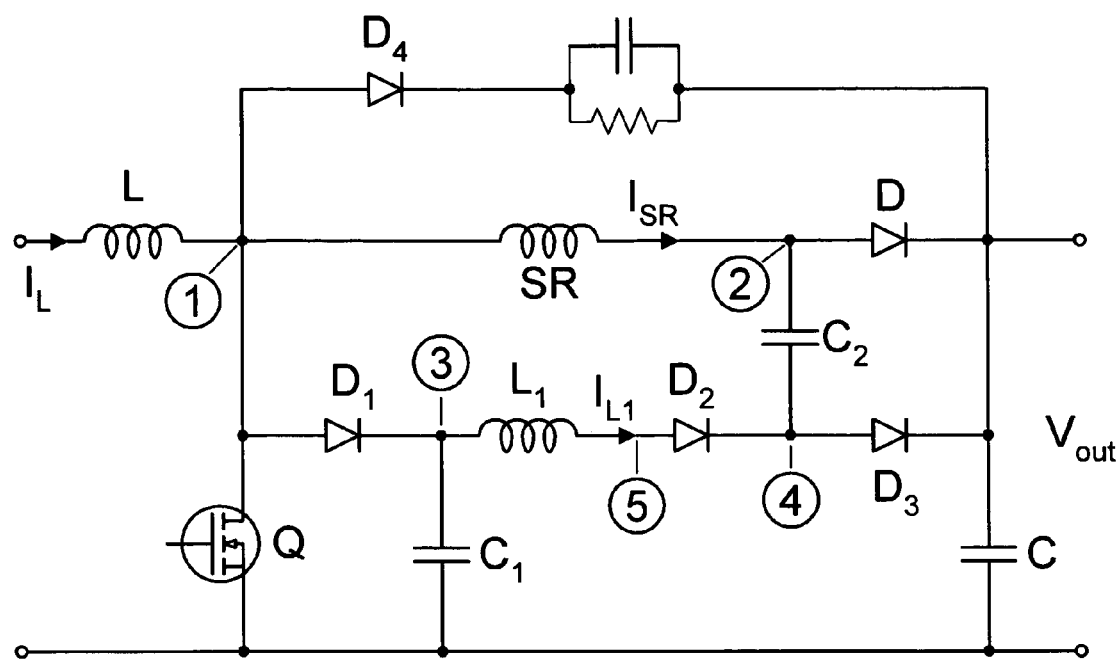
FIG. 5 illustrates the new non-dissipative SR snubber circuit of FIG. 2 with the zener diode D5 replaced with a parallel connection of one resistor and capacitor.

Please note that the zener diode D5 could be replaced with a parallel connection of one resistor and capacitor as shown on FIG. 5. This is a less expensive solution but with less predictable maximum voltage on the main switch Q.

It is also important to notice that all diodes in this new non-dissipative SR snubber circuit, except diode $D_2$, naturally turn off with a very low di/dt. That means that there is no reverse recovery problem in those diodes. However, particularly in the circuits with power factor correction (PFC), the resonant discharge of the capacitor $C_1$ during interval (c) must be designed to be very short so that low duty-ratio operation can be achieved, which is necessary at the peak of the line voltage when it is at the maximum of the input voltage range (worst case condition). That limitation results in a relatively high di/dt of the reverse recovery current in diode $D_2$ which could cause a significant voltage undershoot in node 5 because of the magnetic energy stored in the inductance $L_1$. This could lead to the high over voltage on diode $D_2$ that could cause its failure. To prevent this condition, a diode from ground to node 5 could be inserted to clamp the voltage across diode $D_2$ to the value of the output voltage $V_{out}$. Another solution (with some additional losses) could be to damp the inductor $L_1$ with a resistor in parallel or in series.

CONCLUSION

A passive non-dissipative snubber with a single saturable reactor is shown to be very effective in both eliminating the excessive voltage spikes on the high voltage switching devices of boost converter with active Power Factor Correction (PFC) feature and at the same time also effective in substantially reducing the EMI noise, thereby making it possible to meet harmonic current requirements of IEC 1000-3-2 regulations with only minimal additional filtering.

What is claimed is:

1. A non-dissipative Saturable Reactor (SR) snubber circuit for a high voltage main switch of a boost converter comprising:

an inductor winding placed on a special saturable magnetic core to form a saturable reactor;

said saturable reactor connected at one end thereof to a drain terminal of said main switch and output end of an input inductor of said boost converter, and an other end of said saturable reactor connected to an anode terminal of main diode of said boost converter;

a charging diode, having an anode terminal connected to said one end of said saturable reactor;

a charging capacitor, having one end connected to a cathode terminal of said charging diode and an other end of said charging capacitor connected to a source terminal of said main switch;

a resonant inductor, having one end connected to said cathode terminal of said charging diode;

a blocking diode, having an anode terminal connected to an other end of said resonant inductor;

a resonant capacitor, having one end connected to a cathode terminal of said blocking diode and an other end of said resonant capacitor connected to said other end of said saturable reactor;

a discharging diode, having an anode terminal connected to said cathode terminal of said blocking diode and a cathode terminal of said discharging diode connected to a cathode terminal of said main diode;

a clamping diode, having an anode terminal connected to said drain terminal of said main switch;

a zener diode, having an anode terminal connected to said cathode terminal of said main diode and a cathode terminal of said zener diode connected to a cathode terminal of said clamping diode;

wherein said main switch is a semiconductor current bi-directional switching device, capable of conducting the current in both directions while in an ON state, and sustaining voltage in one direction while in an OFF state;

wherein said semiconductor switching device turns ON and OFF at high switching frequency;

wherein after said main switch is turned ON, a reverse current starts to flow through said main diode driving said saturable reactor quickly out of saturation, and increased inductance of said saturable reactor limits said reverse current of said main diode to a low value to cause said main diode stop conducting;

wherein after said main switch is turned OFF, charging capacitor is charged to the level of output voltage of said boost converter, said resonant capacitor is fully discharged to zero, and all current from said input inductor flows through said saturable reactor and said main diode;

whereby high voltage spikes on the input high voltage switching transistor of the boost converter are eliminated and EMI noise is much reduced while converter efficiency is improved with the lower voltage rated devices with lower ON-resistance.

* * * * *